US012776702B2

(12) United States Patent
Shimizu et al.

(10) Patent No.: US 12,776,702 B2
(45) Date of Patent: Oct. 27, 2026

(54) POWER CONVERSION SYSTEM USING DAISY-CHAIN COMMUNICATION LINE AND CONTROL METHOD

(71) Applicant: TMEIC Corporation, Tokyo (JP)

(72) Inventors: Yoshifumi Shimizu, Tokyo (JP); Naoto Niimura, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/688,193

(22) PCT Filed: Aug. 24, 2022

(86) PCT No.: PCT/JP2022/031887
§ 371 (c)(1),
(2) Date: Feb. 29, 2024

(87) PCT Pub. No.: WO2024/042639
PCT Pub. Date: Feb. 29, 2024

(65) Prior Publication Data
US 2025/0183791 A1 Jun. 5, 2025

(51) Int. Cl.
*H02M 1/36* (2007.01)
*H02M 1/00* (2006.01)
*H02M 5/45* (2006.01)

(52) U.S. Cl.
CPC ........... *H02M 1/36* (2013.01); *H02M 1/0009* (2021.05); *H02M 5/45* (2013.01)

(58) Field of Classification Search
CPC ............. H02M 1/0003; H02M 1/0009; H02M 1/0012; H02M 1/0025; H02M 1/0041; H02M 1/0067; H02M 1/007; H02M 1/0074; H02M 1/0077; H02M 1/0085; H02M 1/0095; H02M 1/08; H02M 1/084; H02M 1/0845; H02M 1/32; H02M 1/36;
(Continued)

(56) References Cited

U.S. PATENT DOCUMENTS 9,425,705 B2 * 8/2016 Zargari .................. H02M 1/32

FOREIGN PATENT DOCUMENTS

JP 8-328636 A 12/1996
JP 2006033475 A * 2/2006
JP 2015220495 A * 12/2015

OTHER PUBLICATIONS

English translation of JP-2015220495-A. (Year: 2015).*
English translation of JP-2006033475-A. (Year: 2006).*

* cited by examiner

*Primary Examiner* — Thienvu V Tran
*Assistant Examiner* — Carlos O Rivera-Perez
(74) *Attorney, Agent, or Firm* — Knobbe, Martens, Olson & Bear, LLP

(57) ABSTRACT

A daisy-chain communication line of a power conversion system connects a master station for controlling a plurality of slave stations each including a power converter to the plurality of slave stations. The plurality of slave stations is configured to supply electric power to a load device from the power converter of each slave station. Each of the plurality of slave stations switches between "operation" for supplying electric power from the power converter and "suspension" for suspending supply of electric power and supplies electric power to the load device. The daisy-chain communication line includes a group of a first communication line for sending the control signal α and a second communication line for sending the operation permission signal β.

12 Claims, 8 Drawing Sheets

(58) Field of Classification Search
CPC ............ H02M 5/00; H02M 5/40; H02M 5/42; H02M 5/45; H02M 5/4505; H02M 5/451; H02M 5/452; H02M 5/458; H02M 5/4585; H02M 7/21; H02M 7/219; H02M 7/42; H02M 7/44; H02M 7/48; H02M 7/4826; H02M 7/483–49
USPC ...... 363/15–21.3, 34, 35, 37, 38, 40–43, 50, 363/55–58, 65, 71, 72, 106, 109, 123, 363/124, 131–134; 323/266, 268–277, 323/282–285, 351; 361/64–69, 81
See application file for complete search history.

POWER CONVERSION SYSTEM USING DAISY-CHAIN COMMUNICATION LINE AND CONTROL METHOD

TECHNICAL FIELD

An embodiment of the present invention relates to a power conversion system and a control method.

BACKGROUND ART

There is a multi-cell power conversion system (inverter system) including an inverter in each of a plurality of cell units. An inverter of each cell unit in such a power conversion system is supplied with a control signal for controlling the inverter (hereinafter simply referred to as a control signal α) and an operation permission signal indicating a state in which operation of the inverter of each cell unit is permitted (hereinafter simply referred to as an operation permission signal β) from a host control device (a master station) by communication.

Some or all of the cell units in the power conversion system may be integrated into a common communication system and connected in a daisy-chain manner. In general, in a system including a plurality of devices connected in a daisy-chain manner, it may be difficult to transmit information downstream from a failure occurrence part. In such a power conversion system, safe suspension when a failure occurs and easy identification of a failure part are required.

CITATION LIST

Patent Document

[Patent Document 1]
Japanese Unexamined Patent Application, First Publication No. H08-328636

SUMMARY OF INVENTION

Technical Problem

An objective of the present invention is to provide a power conversion system and a control method that can identify a part in which a communication failure occurs in a communication system in which a plurality of power converters is connected in a daisy-chain manner.

Solution to Problem

A power conversion system according to an embodiment includes a daisy-chain communication line and a plurality of slave stations. The daisy-chain communication line connects a master station for controlling the plurality of slave stations each including a power converter to the plurality of slave stations. The plurality of slave stations has a configuration in which a load device is connected to the power converter of a slave station and electric power is supplied to an electric motor, each of the plurality of slave stations switching between “operation” for supplying electric power from the power converter and “suspension” for suspending supply of electric power and supplying electric power to the load device. Out of a control signal α for controlling the power converter of each of the plurality of slave stations and an operation permission signal β for permitting an operation of supplying electric power from the power converter of each slave station, the daisy-chain communication line includes a group of a first communication line for sending the control signal α and a second communication line for sending the operation permission signal β. When a communication failure is detected, each slave station “suspends” supply of electric power from the power converter of the slave station having detected the communication failure and “suspends” supply of electric power from the power converter of another slave station out of the plurality of slave stations by controlling the other slave station using the control signal α and the operation permission signal β. Then, some or all of the plurality of slave stations notify the master station of information on a failure part defined to identify the failure part using the control signal α in a state in which supply of electric power from the corresponding power converters has been “suspended.”

DESCRIPTION OF EMBODIMENTS

Figure 1:
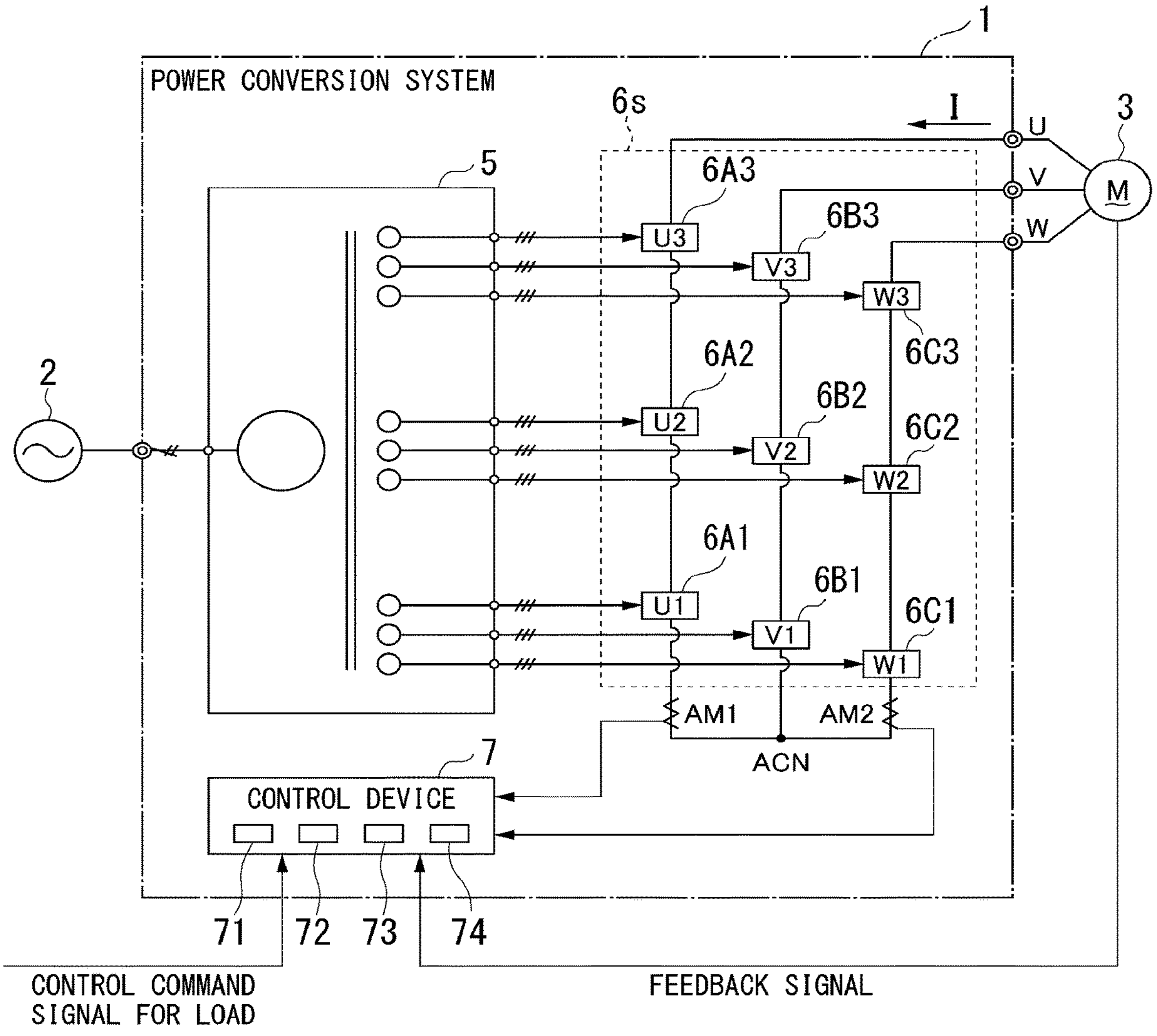
FIG. 1 is a diagram illustrating an example of a power conversion system according to an embodiment.

Hereinafter, a power conversion system and a control method according to an embodiment will be described with reference to the accompanying drawings. In the following description, elements having the same or similar functions will be referred to by the same reference signs. Repeated description of the elements may be omitted. In the drawings referred to for the following description, control gate lines and the like may be omitted for the purpose of convenience of explanation.

A power conversion system according to the embodiment constitutes a multi-cell power conversion system. The multi-cell power conversion system includes a plurality of cell units. Here, a “positive electrode P” and a “negative electrode N” in the plurality of cell units will be first defined. The “positive electrode P” means a part having a positive potential in each cell unit when a power conversion system 1 operates. The “negative electrode N” means a part having a negative potential in each cell unit when the power conversion system 1 operates.

The power conversion system 1 according to the embodiment will be described below with reference to FIGS. 1 to 5B.

FIG. 1 is a diagram illustrating an example of the power conversion system 1 according to the embodiment. In FIG. 1, electrical circuit systems are indicated by a solid line, and a circuit breaker or the like is not illustrated.

A power supply side of the power conversion system 1 is connected to an AC power source 2, for example, via a switch. The power conversion system 1 converts AC electric power supplied from the AC power source 2 to DC electric power, converts the DC electric power to AC electric power of desired frequency and voltage, and supplies the AC electric power to an electric motor 3. The electric motor 3 is, for example, a three-phase induction motor, but the present invention is not limited thereto.

In this embodiment, it is assumed that the power conversion system 1 includes a plurality of cell units 6*s*. The power conversion system 1 includes, for example, an input transformer 5, a plurality of cell units 6*s*, a control device 7, and a current sensor AM.

The input transformer 5 is supplied with AC electric power from the AC power source 2. The input transformer 5 transforms a voltage (a primary voltage) of the AC electric power supplied from the AC power source 2 to a desired secondary voltage and supplies AC electric power of the secondary voltage to the plurality of cell units 6*s*. The input transformer 5 includes a primary winding and a plurality of coil groups (secondary windings) insulated from each other. The primary winding and the secondary windings are also insulated from each other.

The plurality of cell units 6*s* include, for example, three load first-phase cell units 6A1, 6A2, and 6A3 (U1, U2, and U3 in the drawing), three load second-phase cell units 6B1, 6B1 (V1, V2, and V3 in the drawing), and 6B3, and three load third-phase cell units 6C1, 6C2, and 6C3 (W1, W2, and W3 in the drawing). The cell units 6A1, 6A2, 6A3, 6B1, 6B1, 6B3, 6C1, 6C2, and 6C3 have the same circuit configuration and are simply referred to a cell unit 6 when they are not distinguished. For example, the plurality of cell units 6*s* are an example of a plurality of slave stations, and the cell unit 6 is an example of a slave station. Each cell unit 6 converts three-phase AC electric power supplied from the secondary winding of the input transformer 5 to DC electric power, converts the DC electric power to AC electric power of desired frequency and voltage, and outputs the AC electric power.

For example, a secondary first group of the input transformer 5 is connected to an input of the cell unit 6A1. A secondary second group of the input transformer 5 is connected to an input of the cell unit V1. A secondary third group of the input transformer 5 is connected to an input of the cell unit W1. A secondary fourth group of the input transformer 5 is connected to an input of the cell unit 6A2. A secondary fifth group of the input transformer 5 is connected to an input of the cell unit 6B2. A secondary sixth group of the input transformer 5 is connected to an input of the cell unit 6C2. A secondary seventh group of the input transformer 5 is connected to an input of the cell unit 6A3. A secondary eighth group of the input transformer 5 is connected to an input of the cell unit 6B3. A secondary ninth group of the input transformer 5 is connected to an input of the cell unit 6C3.

In this embodiment, outputs of the cell units 6A1, 6A2, and 6A3 are electrically connected in series to each other in this order. An output terminal of the cell unit 6A3 not connected to the cell unit 6A2 is connected to the first phase (a U phase) of the electric motor 3. An output terminal of the cell unit 6A1 not connected to the cell unit 6A2 is connected to a neutral point. In this embodiment, outputs of the cell units 6B1, 6B2, and 6B3 are electrically connected in series to each other in this order. An output terminal of the cell unit 6B3 not connected to the cell unit 6B2 is connected to the second phase (a V phase) of the electric motor 3. An output terminal of the cell unit 6B1 not connected to the cell unit 6B2 is connected to a neutral point. In this embodiment, outputs of the cell units 6C1, 6B2, and 6B3 are electrically connected in series to each other in this order. An output terminal of the cell unit 6C3 not connected to the cell unit 6C2 is connected to the third phase (a W phase) of the electric motor 3. An output terminal of the cell unit 6C1 not connected to the cell unit 6C2 is connected to a neutral point. Accordingly, the power conversion system 1 can supply AC electric power of a large capacity to the electric motor 3.

A current sensor AM1 and a current sensor AM2 are examples of the current sensor AM and detect a load current (a phase current) flowing between an inverter 13 (FIG. 2) and the electric motor 3 of the power conversion system 1. In a system including a configuration for generating an estimated value of a load current, the current sensor AM may be omitted.

The control device 7 controls or protects the cell units 6. The control device 7 includes, for example, a storage unit 71, an operating control unit 72, a control status estimating unit 73, and a braking control unit 74.

The storage unit 71 stores various types of data associated with control of the plurality of cell units 6*s*. Various types of data include, for example, the number of stages of the cell units 6 connected in a daisy-chain manner, a control signal α, and a received value and a transmitted value of a control permission signal β.

The operating control unit 72 generates a control signal α for controlling switching elements 13S (FIG. 2) included in the cell units 6 on the basis of data stored in the storage unit 71. The operating control unit 72 controls the cell units 6 by sending the generated control signal α to the cell units 6. The operating control unit 72 may acquire a signal indicating a control status of the electric motor 3 (for example, a feedback signal of a rotation speed) and control the cell units 6 on the basis of the feedback signal. The control device 7 acquires a control command signal for the electric motor 3 from another device and controls the cell units 6 on the basis of the control command signal.

The control status estimating unit 73 estimates an operating state of the power conversion system 1 on the basis of a receiving state of the control signal α, information included in the received control signal α, information indicated by a received control permission signal β, and the like. Details thereof will be described later.

The braking control unit 74 controls the cell units 6 on the basis of the estimation result of the operating state of the power conversion system 1 and controls the constituents such that the electric motor 3 is braked on the basis of the control status. For example, the braking control unit 74 brakes the electric motor 3 by limiting operating of the cell units 6 when the control signal for the cell units 6 cannot safely reach the cell units 6. The braking control unit 74 detects statuses of the control signal α and the operation permission signal β which will be described later for the purpose of this control, estimates a status on the basis thereof, and sends the operation permission signal β which will be described later to the cell units 6, whereby the braking is realized.

The cell units 6 will be described below.

Figure 2A:
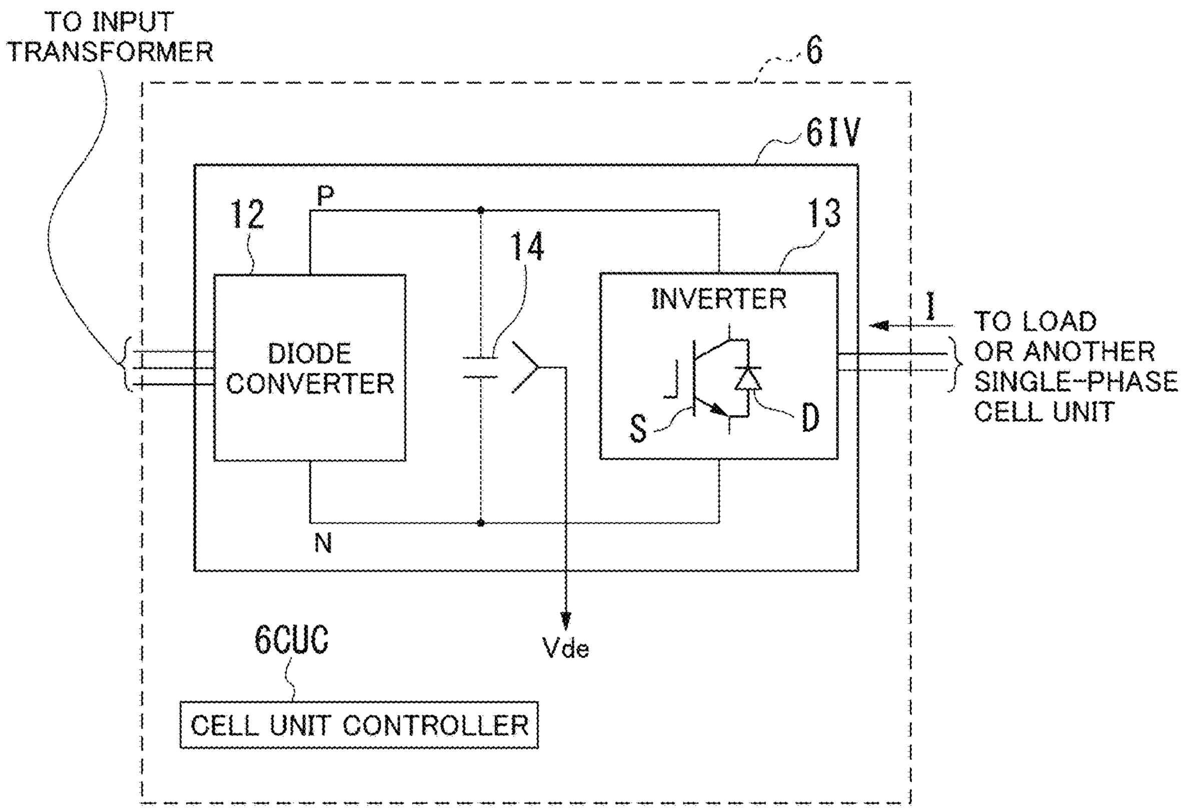
FIG. 2A is a diagram illustrating a configuration of a cell unit according to the embodiment.
Figure 2B:
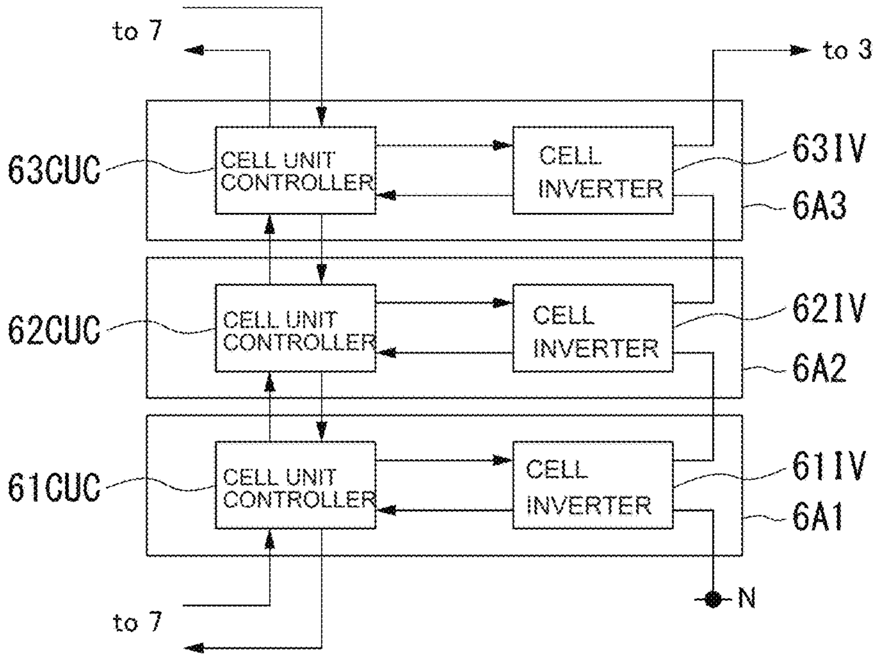
FIG. 2B is a diagram illustrating a configuration of a plurality of cell units which are connected in a cascade manner according to the embodiment.
Figure 2C:
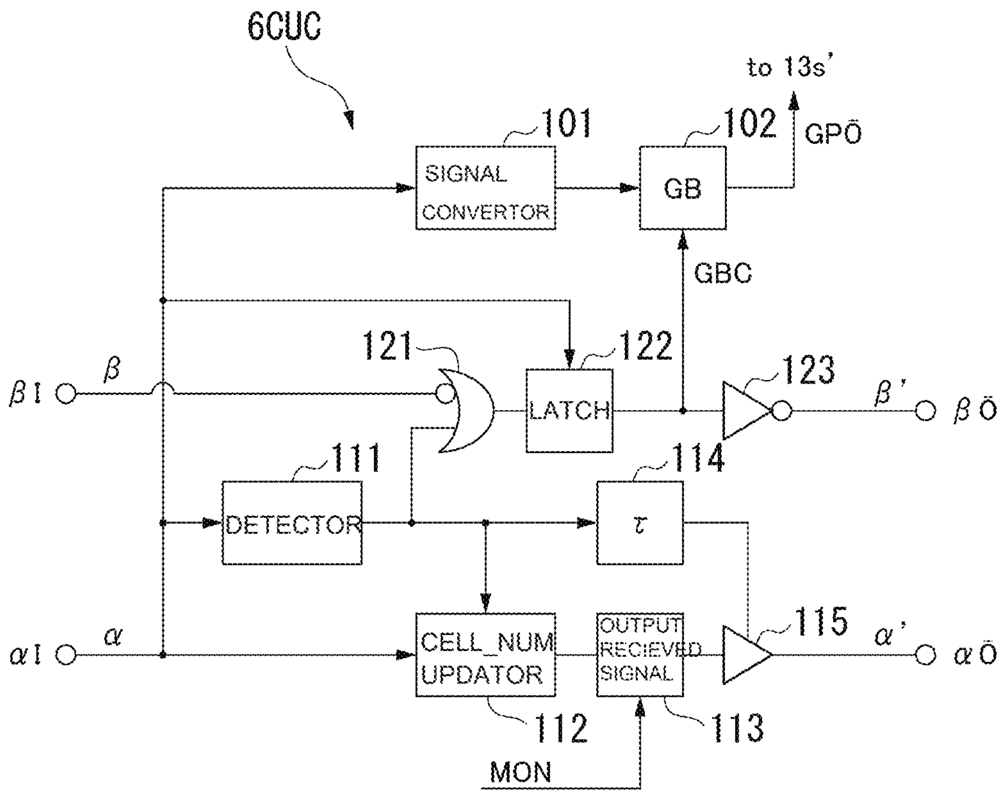
FIG. 2C is a diagram illustrating a configuration of a cell unit controller in a cell unit according to the embodiment.

FIG. 2A is a diagram illustrating a configuration of a cell unit 6 according to the embodiment. FIG. 2B is a diagram illustrating a configuration of a plurality of cell units 6*s* which are connected in a cascade manner according to the embodiment. FIG. 2C is a diagram illustrating a configuration of a cell unit controller 6CUC in each cell unit 6 according to the embodiment.

The cell unit 6 includes, for example, a single-phase cell inverter 6IV and a cell unit controller 6CUC.

The single-phase cell inverter 6IV is, for example, a single-phase alternating current output inverter. The single-phase cell inverter 6IV includes, for example, a diode converter 12, an inverter 13, a smoothing capacitor 14, and resistors 15 and 16. A DC output of the diode converter 12 and a DC input of the inverter 13 are electrically connected via DC links between positive electrodes (P) thereof and between negative electrodes (N) thereof. The smoothing capacitor 14 is provided in a DC link, and terminals of the smoothing capacitor 14 is electrically connected to the positive electrode and the negative electrode of the DC link.

In the following description, an example of a connection relationship to the outside in the cell unit 6A1 will be described. The same is true of the other cell units 6.

The diode converter 12 is a three-phase alternating current input converter, and an input part thereof is electrically connected to one secondary group of the input transformer 5. The diode converter 12 converts AC electric power input from the input transformer 5 to DC electric power by rectifying an alternating current. The smoothing capacitor 14 smooths a converted DC voltage.

The inverter 13 is a single-phase alternating current output inverter. The inverter 13 includes, for example, a switching element 13S for converting DC electric power to AC electric power on the DC side and a reverse diode 13D connected in reverse parallel to the switching element 13S. The switching element 13S is an example of a semiconductor switching element. A DC side of the inverter 13 is connected to a DC output of the diode converter 12, and an AC side thereof is connected in series to the electric motor 3 or an output of another cell unit 6. For example, the inverter 13 outputs converted AC electric power to the first phase of the electric motor 3.

A resistor (not illustrated) for discharging electric charge accumulated in the smoothing capacitor 14 may be provided.

The cell unit controller 6CUC generates a signal for controlling the diode converter 12 and the switching element constituting the inverter 13 under the control of the control device 7. The cell unit controller 6CUC controls the diode converter 12 and the switching element constituting the inverter 13 using the generated signal.

For example, although detailed connection structures therein are not illustrated, the inverter 13 includes one or more switching elements and converts electric power by switching of the switching elements. A type of the switching elements is an insulated gate bipolar transistor (IGBT), an injection enhanced gate transistor (IEGT), or a metal-oxide-semiconductor field-effect transistor (MOSFET). The inverter 13 serves as an inverter for generating AC electric power under control and allows a current to flow to a winding of the electric motor 3 in cooperation with another inverter connected to the output thereof.

For example, the cell unit controller 6CUC of each cell unit 6 identifies disconnection of the control signal α from an upstream stage for a predetermined time as an abnormal state. In this case, first, the cell unit controller 6CUC first suspends conversion of electric power of the corresponding stage and transmits a signal indicating "suspension" as the operation permission signal β to the upstream stage.

As illustrated in FIG. 2C, the cell unit controller 61CUC of the cell unit 61 includes a control signal α input port αI and an operation permission signal β input port β1 as ports for receiving a signal from the outside and includes a control signal α output port αO, an operation permission signal β output port βO, and a gate pulse output port GPO as ports for outputting a signal from the outside.

The cell unit controller 61CUC further includes processing blocks 101, 102, 111 to 115, and 121 to 123.

A control signal α from the cell unit 6 or the control device 7 which is a downstream stage is supplied to the control signal α input port αI. Inputs of the processing blocks 101, 111, and 112 are connected to the control signal α input port αI.

The processing block 101 extracts a control command from the control signal α and calculates a control quantity of control with the control command as a control target. An output signal of the control quantity is a pulse which has been converted to a binary value by PWM control or the like. The processing block 102 (GB) limits outputting of a gate pulse corresponding to the pulse output from the processing block 101 using a GBC signal output from the processing block 122. For example, the processing block 102 limits outputting of a gate pulse when the logic of the GBC signal is logic 1 and outputs a gate pulse from the gate pulse output port GPO when the logic of the GBC signal is logic 0.

The processing block 111 detects that supply of the control signal α is suspended for a predetermined time. The processing block 111 outputs logic ( ) when supply of the control signal α is detected and outputs logic 1 when suspension of supply of the control signal α for a predetermined time is detected. The output of the processing block 111 is connected to a second input of the processing block 121, a control input of the processing block 112, and an input of the processing block 114.

The processing block 112 extracts CELL_NUM from the control signal α, generates CELL_NUM by updating the extracted one, and outputs a signal in which CELL_NUM in the control signal α is replaced. When logic 1 indicating that supply of the control signal α is suspended for the predetermined time is output from the processing block 111, the processing block 112 outputs CELL_NUM with a value set to 0.

The processing block 113 receives CELL_NUM output from the processing block 112, monitoring information MON indicating a state in the cell unit controller 61CUC and outputs the received signals on the basis of predetermined criteria. For example, the monitoring information MON includes a state of a latch (for example, the processing block 122 which will be described later) and transmitting and receiving statuses of the operation permission signal β of each cell unit 6, and the like as will be described later. An operation permission control signal β may include an operation permission signal β input via the operation permission signal β input port βI and an operation permission signal β output from the operation permission signal β output port βO (also referred to as an operation permission signal β input port β'). The output of the processing block 113 is supplied to the processing block 115 in a downstream stage.

The processing block 114 outputs logic 1 as an initial value. The processing block 114 outputs logic 0 when logic 1 is supplied because supply of the control signal α has been suspended for a predetermined time τ or more. The processing block 114 outputs logic 1 when the predetermined time τ elapses further.

The processing block 115 includes an output buffer circuit including an output limiting circuit and outputs the control signal α supplied from the processing block 113 from the control signal α output port αO when logic 1 is output from the processing block 114. On the other hand, the processing block 115 outputs no signal from the control signal α output port αO when logic 0 is output.

The processing block 121 outputs logic 0 when logic 1 is input as the operation permission control signal β via the operation permission signal β input port βI and when logic 0 is output from the processing block 111. The output of the processing block 121 is connected to the input of the processing block 122.

The processing block 122 includes a latch. The processing block 123 includes an output buffer circuit.

For example, the processing block 122 is a latch that detects transition of the logic of an input signal from logic 0 to logic 1 and holds and outputs logic 1. The latch state of the processing block 122 is reset by a "failure reset signal" included in the control signal α sent from the control device 7.

In this case, the processing block 122 holds and outputs logic 0. The output of the processing block 122 is connected to the GBC signal input of the processing block 102 and the input of the processing block 123. Accordingly, since the processing block 122 outputs logic 0, the processing block 102 outputs a gate pulse via the gate pulse output port GPO. In this case, the processing block 123 inverts the logic and outputs an operation permission control signal β of logic 1 from the operation permission signal β output port βO. The control status in this case is a status in which "operation" is permitted.

The processing block 121 causes the logic of the output to transition from logic 0 to logic 1 when logic 0 is input as the operation permission control signal β (includes a case in which it transitions to logic 0) or when logic 1 is output from the processing block 111. Accordingly, the processing block 122 detects the transition and outputs logic 1. In this case, the processing block 102 limits outputting of a gate pulse and outputs no signal from the gate pulse output port GPO. In this case, the processing block 123 inverts the logic and outputs an operation permission control signal β of logic 0 from the operation permission signal β output port βO. The control status in this case is a "suspended" state in which operation is limited.

When an abnormality disturbing operating is detected as described above, each cell unit 6 outputs an operation permission signal β indicating "suspension" to a next stage. When an operation permission signal β indicating "suspension" is received, each cell unit 6 outputs an operation permission signal β indicating "suspension" to a next stage.

For the purpose of simplification of explanation, various processes performed by each cell unit controller 6CUC may be referred to as processes of each cell unit 6 in the following description.

The control device 7 includes a control signal α output port for sending a control signal α for controlling an operating state of each cell unit 6 to a cell unit 63 (a second slave station) of the cell units 6 and a control signal α input port for receiving a control signal α from a cell unit 61 (a first slave station) out of the cell units 6.

The control device 7 includes an operation permission signal β output port for sending an operation permission signal β indicating "operation" or "suspension" as the operation permission signal β to the cell unit 61 (the first slave station) out of the cell units 6 and an operation permission signal β input port for receiving an operation permission signal β from the cell unit 63 (the second slave station) out of the cell units 6. Out of the cell units 6, the cell unit 63 (the second slave station) is located downstream in a sending direction of the operation permission signal β from the cell unit 61 (the first slave station).

Description associated therewith will be described later.

Example of Configuration and Normal State of Power Conversion System 1 According to Embodiment An example of a configuration of a control system of the power conversion system 1 will be described below with reference to FIG. 3.

Figure 3:
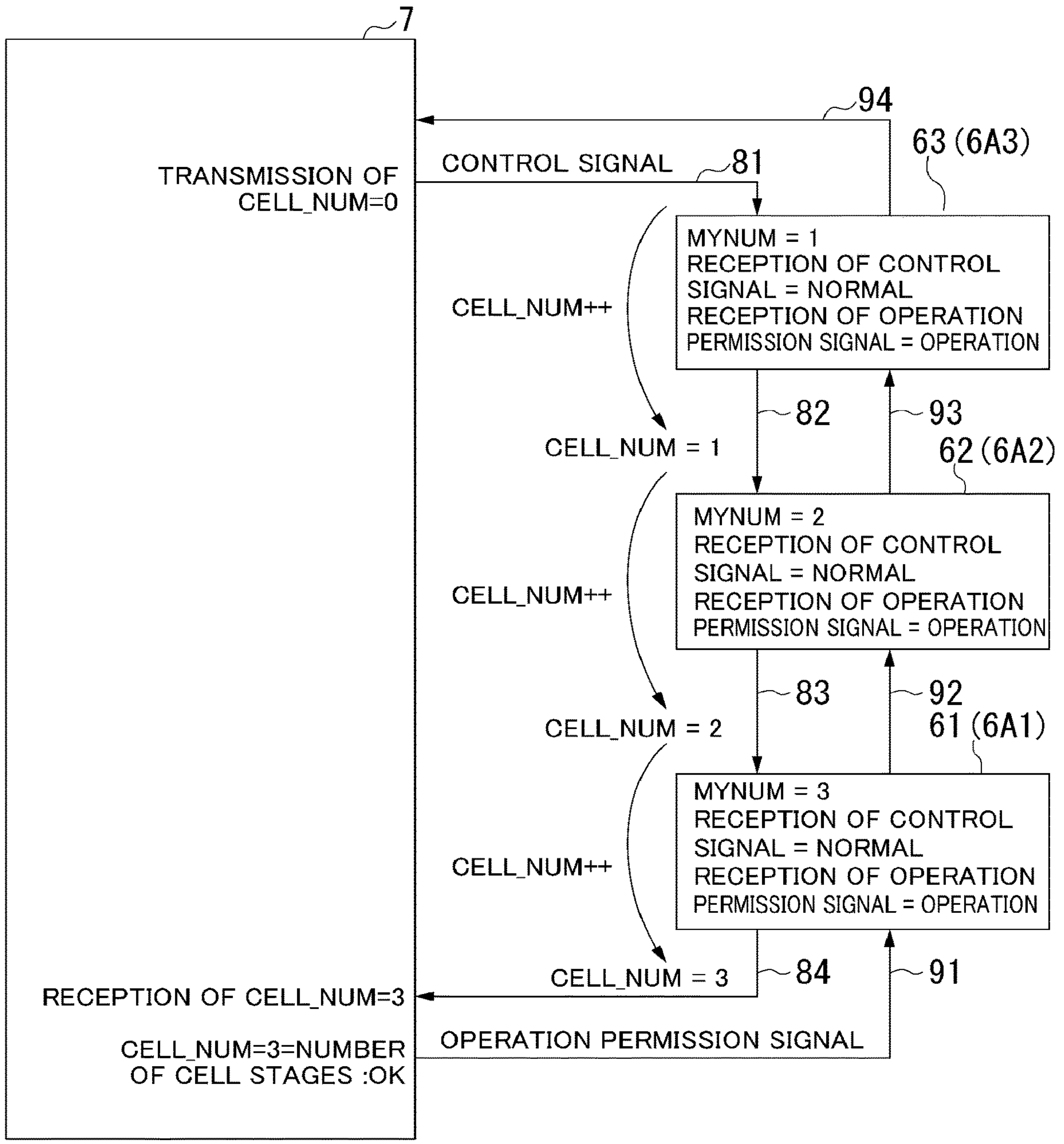
FIG. 3 is a diagram illustrating an example of a configuration of a control system of the power conversion system according to the embodiment.

FIG. 3 is a diagram illustrating an example of the configuration of the control system of the power conversion system 1 according to the embodiment.

The system illustrated in FIG. 3 includes a control device 7 (a cell-control command board), three cell units 6 (61, 62, and 63), and daisy-chain communication lines 8 and 9 for sending a signal of a control system. The control device 7 may be referred to as a master station, and the cell units 6 may be referred to as slave stations. The range illustrated herein exemplifies a range corresponding to the U phase of the electric motor 3 out of sections partitioned into the phases of the electric motor 3.

The daisy-chain communication lines 8 and 9 connect the control device 7 and a plurality of cell units 6*s*. Reference signs 81 to 84 are examples of connection media constituting the daisy-chain communication line 8. The connection media 81 to 84 in the embodiment are insulated from each other. Reference signs 91 to 94 are examples of connection media constituting the daisy-chain communication line 9. The connection media 91 to 94 in the embodiment are insulated from each other. The daisy-chain communication line 8 is configured to communicate in at least one direction. The daisy-chain communication line 9 is configured to communicate in at least one direction.

For example, the daisy-chain communication line 8 is configured to send at least a control signal α.

For example, one end of the connection medium 81 is connected to the control signal α output port of the control device 7, and the other end of the connection medium 81 is connected to the control signal α input port of the cell unit 63. One end of the connection medium 82 is connected to the control signal α output port of the cell unit 63, and the other end of the connection medium 82 is connected to the control signal α input port of the cell unit 62. One end of the connection medium 83 is connected to the control signal α output port of the cell unit 62, and the other end of the connection medium 83 is connected to the control signal α input port of the cell unit 61. One end of the connection medium 84 is connected to the control signal α output port of the cell unit 61, and the other end of the connection medium 84 is connected to the control signal α input port of the control device 7.

For example, the daisy-chain communication line 9 is configured to send at least an operation permission signal β

For example, one end of the connection medium 91 is connected to the operation permission signal β output port of the control device 7, and the other end of the connection medium 91 is connected to the operation permission signal β input port of the cell unit 61. One end of the connection medium 92 is connected to the operation permission signal β output port of the cell unit 61, and the other end of the connection medium 92 is connected to the operation permission signal β input port of the cell unit 62. One end of the connection medium 93 is connected to the operation permission signal β output port of the cell unit 62, and the other end of the connection medium 93 is connected to the operation permission signal β input port of the cell unit 63. One end of the connection medium 94 is connected to the operation permission signal β output port of the cell unit 63, and the other end of the connection medium 94 is connected to the operation permission signal β input port of the control device 7.

The control signal α includes a control signal for controlling the power converter of each cell unit 6. The operation permission signal β includes an operation permission signal for an operation of supplying electric power from the power converter of each cell unit 6.

The group of daisy-chain communication lines is constituted by combining the daisy-chain communication line 8 (a first communication line) for sending the control signal α out of the control signal α and the operation permission signal β and the daisy-chain communication line 9 (a second communication line) for sending the operation permission signal β out of the control signal α and the operation permission signal β.

For example, the daisy-chain communication line 8 (the first communication line) includes at least the connection media 81 to 84. The daisy-chain communication line 8 (the first communication line) may include the cell units 61 to 63 in addition to the connection media 81 to 84. The daisy-chain communication line 9 (the second communication line) includes at least the connection media 91 to 94. The daisy-chain communication line 9 (the second communication line) may include the cell units 61 to 63 in addition to the connection media 91 to 94.

As described above, in a plurality of cell units 6*s*, the single-phase cell inverter 6IV (a power converter) in each cell unit 6 is connected to the electric motor 3 (a load device) and is configured to supply electric power to the electric motor 3. The plurality of cell units 6*s* supplies electric power to the electric motor 3 (the load device) by switching between "operation" for supplying electric power from the power converter and "suspension" for suspending the supply of electric power.

For example, when a communication failure is detected in a situation in which the control signal α cannot be received, each cell unit 6 "suspends" supply of electric power from the power converter of the cell unit 6 having detected the communication failure and additionally controls the other cell units 6 of the plurality of cell units 6*s* using the control signal α and the operation permission signal β. Accordingly, supply of electric power from the power converters of other cell units 6*s* is "suspended." Thereafter, some or all cell units 6 of the plurality of cell units 6*s* notify the control device 7 information on a failure part which is defined to identify the failure part using the control signal α in a state in which the supply of electric power from the power converters is "suspended."

The power conversion system 1 supplies electric power to the load device connected to the power converters of the cell units 6 by controlling the power converters of the cell units 6 using communication between the master station and the cell units 6 and communication between the cell units 6. The power conversion system 1 switches between "operation" for supplying electric power from the power converter and "suspension" for suspending the supply of electric power in supplying electric power.

The plurality of cell units 6*s* receive a control command for a power converter from the master station directly or indirectly.

As described above, the daisy-chain communication lines 8 and 9 are constituted as a group of two daisy chains. Signals transmitted using the daisy-chain communication line 8 include a control signal α, and signals transmitted using the daisy-chain communication line 9 include an operation permission signal β. The cell units 6 in the embodiment are connected in a daisy-chain manner for each communication system using a wired connection type communication line.

(Control Using Control Signal α and Operation Permission Signal β)

The control device 7 sends the control signal α and the operation permission signal β to the cell units 6 in the system associated with the daisy-chain communication lines using the daisy-chain communication lines 8 and 9. The daisy-chain communication lines 8 and 9 can be used independently from each other. The first communication line and the second communication line are provided between the control device 7 and the cell units 6 and between the cell units 6.

For example, a signal polarity of the operation permission signal β can be set such that a suspended state is set at the time of disconnection for the purpose of fail safe. When the daisy-chain communication lines 8 and 9 are constituted as optical communication lines using optical fiber, a state in which a light emitting element is turned off can be defined to be on a "suspension" side.

When an abnormality disturbing operating is detected or when the received operation permission signal β indicates "suspension," the cell units 6 and the control device 7 send "suspension" as the operation permission signal β to a next stage and realizes link suspension at the time of abnormality.

A sending direction of the operation permission signal β in the embodiment is reverse to a sending direction of the control signal α. The daisy-chain communication line 9 is configured to circulate the operation permission signal β in the sending direction. In the following description and drawings, the circulation direction of the operation permission signal β is opposite to that of the control signal α, but the circulation directions may be the same.

In the following description, for the purpose of convenience of explanation, a cell directly receiving the control signal α output from the control device 7 is referred to as a highest-stage cell unit, and a cell carrying the control signal α to the control device 7 is referred to as a lowest-stage cell unit. The lowest-stage cell unit is an example of a first slave station, and the highest-stage cell unit is an example of a second slave station. The highest-stage cell unit in FIG. 3 is the cell unit 63, and the lowest-stage cell unit is the cell unit 61.

(Control and State Monitoring Using Control Signal α)

Out of a pair of cell units 6 (slave stations) facing each other with each wired section interposed therebetween, the self-number (hereinafter simply referred to as MYNUM) identified by a cell unit 6 transmitting the control signal α is defined as a cell stage count CELL_NUM (hereinafter simply referred to as CELL_NUM). The cell unit 6 transmitting the control signal α adds the CELL_NUM to the control signal c.

The control signal α includes the value of CELL_NUM as data. Each cell unit 6 converts a value (CELL_NUM++) obtained by adding 1 to CELL_NUM of the control signal α received from an upstream stage to MYNUM as identification information for relatively identifying its own position and transmits its own MYNUM as CELL_NUM for a downstream stage. The value of CELL_NUM corresponds to the number of times the control signal α is relayed by the cell units 6. This relationship is expressed by Expression (1) and Expression (2). In the expressions, a calculation result of the right side is set as a value of a variable in the left side.

$$MYNUM=CELL\_NUM+1 \quad (1)$$

$$CELL\_NUM=MYNUM \quad (2)$$

(Initial Step in which all Cell Units 6 are Suspended)

The power conversion system 1 enters a state in which the system operates by switching a state in which all the cell units 6 are suspended to a state in which all the cell units 6 operate in predetermined starting order. The state illustrated in FIG. 3 is a state in which all the cell units 6 in the power conversion system 1 operate.

For example, the control device 7 corresponding to the master station transmits an initial value 0 (CELL_NUM=0) to the cell unit 63 which is the highest-stage cell unit. The cell units 6 update the value of CELL_NUM by adding 1 to the received value of CELL_NUM. As illustrated in FIG. 3, the cell unit 61 which is the lowest-stage cell unit outputs 3 as the value of CELL_NUM.

The control device 7 receives CELL_NUM from the cell unit 61 which is the lowest-stage cell unit and ascertains whether the value of CELL_NUM matches the number of cell stages in a daisy chain recorded in advance in the storage unit 71. When both match, the control device 7 ascertains that there is no failure in the daisy-chain communication line 8 for the control signal α. For example, since the number of cell units 6 is 3 as illustrated in FIG. 3, the number of relaying times of the control signal α is 3. The value matches 3 which is output as the value of CELL_NUM from the lowest-stage cell unit as described above. When a failure occurs as will be described later, the value changes from 3 which is a prescribed value.

In the normal state described above, each cell unit 6 ascertains that reception of the control signal α is "normal" and sets a flag indicating a control signal receiving state to a value indicating "normal" (reception of control signal="normal"). At this time, each cell unit 6 ascertains that "operation" is designated from the reception result of the operation permission signal β and sets the flag indicating a control signal receiving state to a value indicating "operation" (reception of operation permission signal="operation").

Control at the time of occurrence of failure will be described below in several scenarios.

First Scenario Associated with Control at the Time of Occurrence of Failure:

A method of identifying a failure part when a failure occurs in a path of a control signal α will be first described.

A method of identifying a failure part when only the path of a control signal α in the daisy chain is disconnected will be described below with reference to FIGS. 4A and 4B. When the failure part differs, a partial signal status may differ. Cases in which an exemplified failure part changes will be described below.

Example 1

Figure 4A:
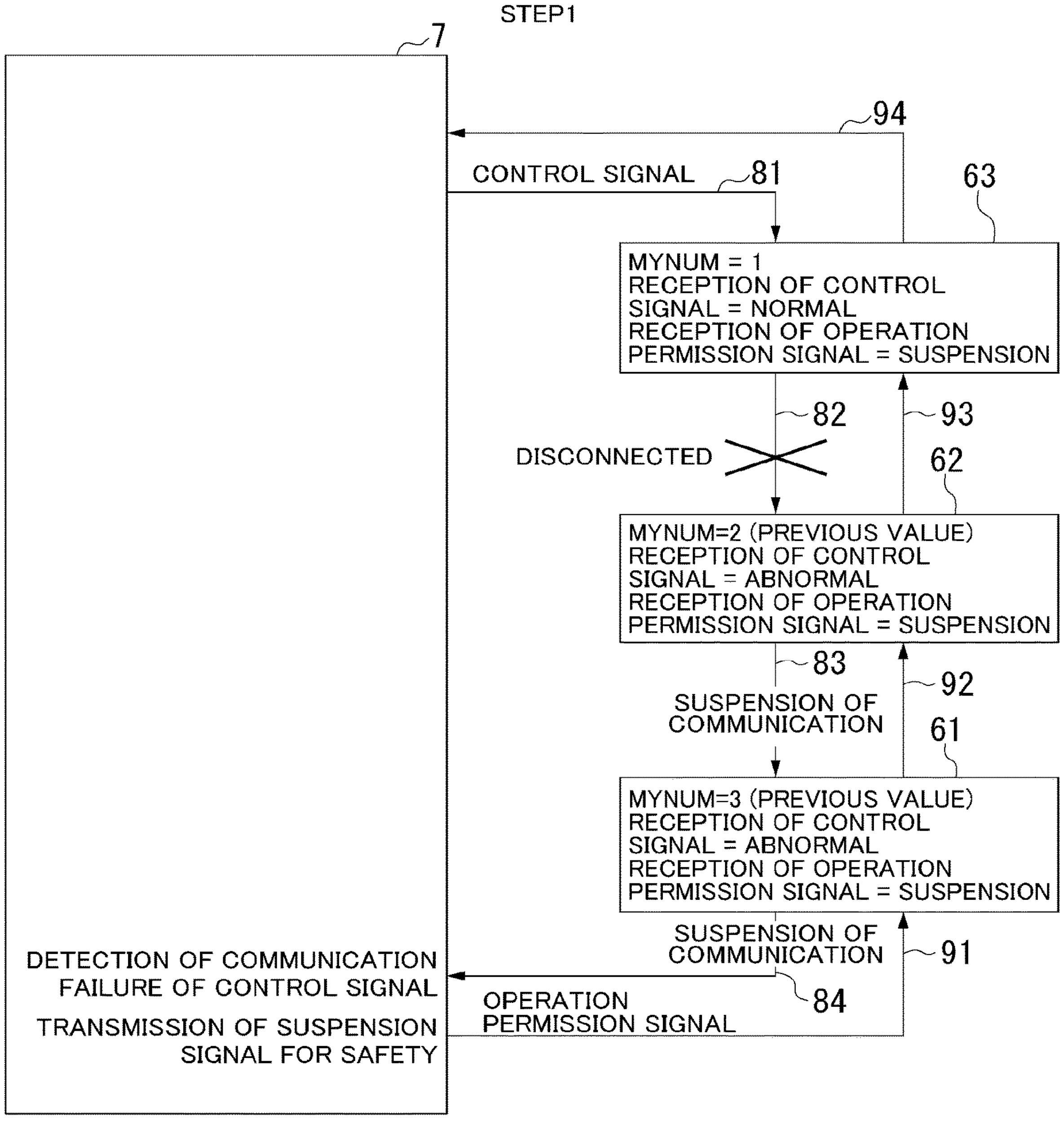
FIG. 4A is a diagram illustrating a case in which only a path of a control signal α is disconnected.
Figure 4B:
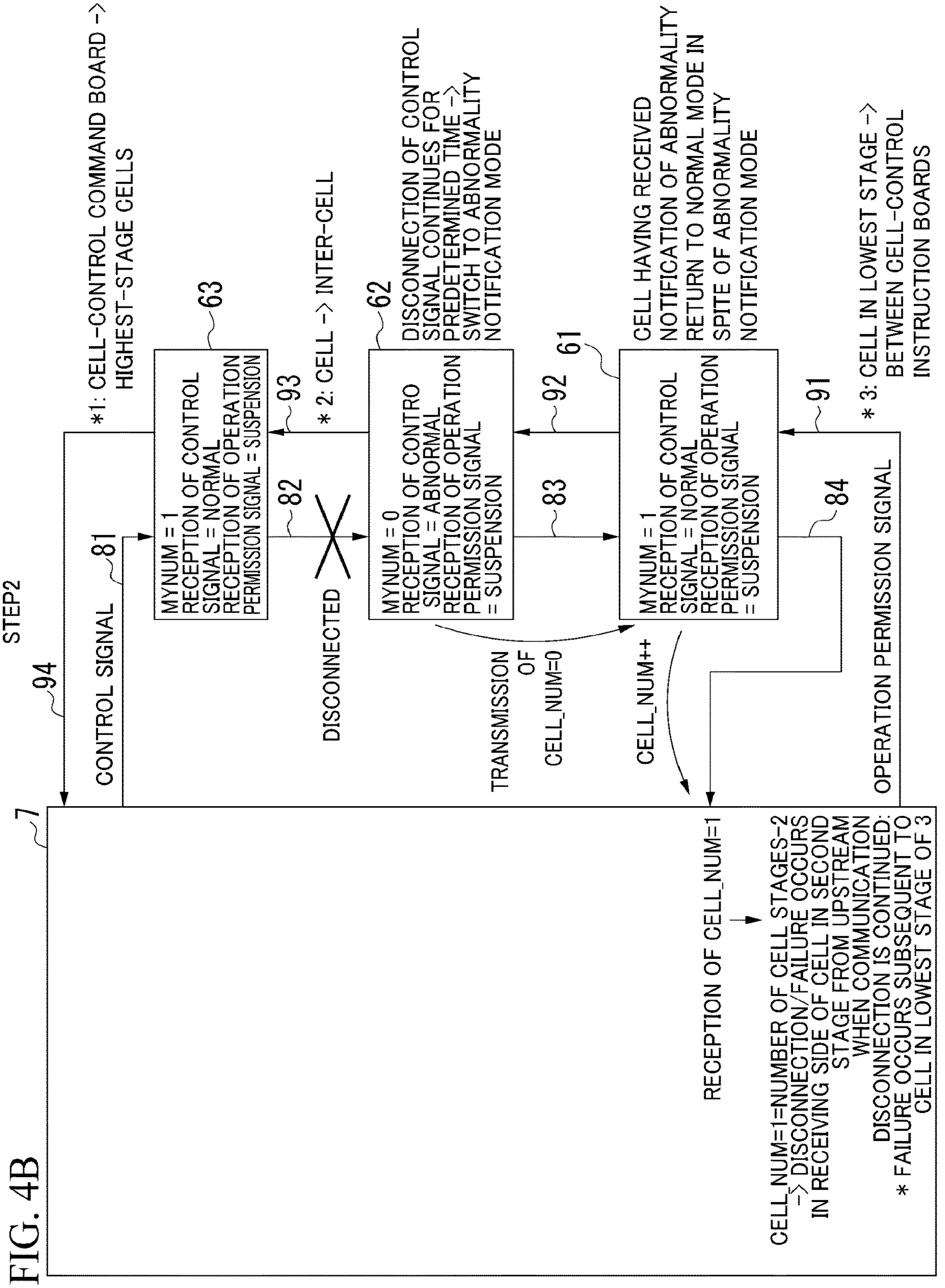
FIG. 4B is a diagram illustrating a case in which only a path of a control signal α is disconnected.

FIGS. 4A and 4B are diagrams illustrating a case in which only the path of the control signal α is disconnected. FIGS. 4A and 4B illustrate a case in which transmission of a control signal α between the cell unit 63 and the cell unit 62 fails as Example 1. The failure in this case includes a failure in a transmission circuit that transmitting a signal to a transmission medium and a failure in a reception circuit that receives a signal from a transmission medium in addition to disconnection of the transmission medium. In the following description, such a failure in a physical transmission path is also referred to as "disconnection."

Each cell unit 6 ascertains an abnormal state of a control signal α from an upstream stage. The cell unit 6 having detected the abnormal state first suspends conversion of electric power in the corresponding stage and transmits an operation permission signal β indicating "suspension" to an upstream stage. When the control signal α is configured to be transmitted continuously or one or more times in a predetermined period, a state in which the control signal α is disconnected for a predetermined time can be detected as an abnormal state.

When an abnormality disturbing operation such as "disconnection" is detected, each cell unit 6 outputs an operation permission signal β indicating that outputting of the single-phase cell inverter 6IV is suspended ("suspension") to a next stage in the sending direction of the operation permission signal β. When the operation permission signal β indicating "suspension" is received, each cell unit 6 is configured to output an operation permission signal β indicating "suspension" to a next stage similarly. The next stage in the sending direction of the operation permission signal β corresponds to an upstream stage in the sending direction of a control signal α.

(Step 1)

Treatment after a failure has occurred in transmission of a control signal α will be described below in STEP 1 and STEP 2.

STEP 1 is a process for safely guiding the cell units 6 in the power conversion system 1 to suspension when a failure occurs in transmission of the control signal α.

For example, as illustrated in FIG. 4A, it is assumed that a failure in transmission such as disconnection occurs in the section of the connection medium 82 of the daisy-chain communication line 8 and the control signal α from the cell unit 63 cannot be ascertained by the cell unit 62.

In this case, the cell unit 62 out of the cell units 6 performs processes of detecting disconnection of the control signal α for a predetermined time as an abnormal state, suspending its own power conversion, and transmitting the operation permission signal β indicating "suspension" to an upstream stage.

Accordingly, when the operation permission signal β indicating "suspension" is received, the cell unit 63 suspends its own power conversion and outputs the operation permission signal β indicating "suspension" to the control device 7 which is a next stage.

The control device 7 receives the operation permission signal β indicating "suspension" (a second operation permission signal β) from the operation permission signal β input port. The control device 7 transmits an operation permission signal β indicating "suspension" (a first operation permission signal β) from the operation permission signal β output port in response to reception of the operation permission signal β indicating "suspension". The control device 7 performs control such that the operation permission signal β indicating "suspension" circulates.

When the abnormality is detected, the cell unit 62 switches the control signal α which is being output to a next stage in a normal state to "communication suspension." Accordingly, the cell unit 61 cannot receive the control signal α similarly to the cell unit 62 having lost the control signal α due to disconnection. Accordingly, the cell unit 61 performs the same process as in the cell unit 62.

As a result, since the cell unit 61 does not transmit the control signal α, a situation in which the control signal α cannot be received ("control signal communication disconnection") occurs in the control device 7. The control device 7 ascertains that a failure has occurred by detecting this situation.

When the operation permission signal β indicating "suspension" is received from the operation permission signal β input port, the control device 7 transmits an operation permission signal β indicating "suspension" from the operation permission signal β output port in response to reception of the operation permission signal β indicating "suspension". Accordingly, the cell units 6 are suspended.

When the control device 7 transmits the first operation permission signal β indicating "suspension" from the operation permission signal β output port, this signal is sequentially transmitted to the cell units 6.

(Step 2)

STEP 2 is a process for identifying a part in which a failure in transmission of the control signal α occurs.

When the cell units are guided to the suspended state through STEP 1, the cell units 6 having temporarily suspended transmission of the control signal α switch to an "abnormality notification mode" and restarts transmission of the control signal α after a predetermined time has elapsed.

At the same time, the cell unit 62 transmits an abnormality notification obtained by adding information of CELL_NUM=0 to the control signal α to be sent to a downstream stage. Unlike the value (CELL_NUM=2) in the normal state, this is the same value as the value transmitted by the control device 7 in the normal state.

When the abnormality notification is received, the cell unit 61 having suspended power conversion switches to the "abnormality notification mode" while maintaining suspension of power conversion.

Thereafter, reception of the control signal α transmitted from the cell unit 62 having switched to the "abnormality notification mode" as described above is restarted. Accordingly, the cell unit 61 detects that reception of the control signal α is restarted, releases the "abnormality notification mode," and switches to a "normal mode." Even when the cell unit 63 switches to the normal mode, the "suspended" state of the operation permission signal β which is received is continued and thus the cell unit 61 does not output converted electric power. Since the operation permission signal β received by the cell units 6 are maintained in the "suspended" state, the cell units 6 in addition to the cell unit 61 do not output electric power.

As in the normal state, the cell unit 61 having returned to the "normal mode" transmits a value obtained by adding 1 to the received CELL_NUM as CELL_NUM to a downstream stage. In case of the cell unit 61, the downstream stage of the cell unit 61 is the control device 7.

The control device 7 receives CELL_NUM from the cell unit 61 in the lowest stage and identifies a disconnection failure part.

When the disconnection failure part is a part illustrated in FIG. 4B (the section of the connection medium 82 of the daisy-chain communication line 8), the control device 7 receives CELL_NUM=1.

When the control device 7 is configured to transmit CELL_NUM=0 to the cell unit 63 as described above, occurrence of a failure is detected because CELL_NUM received by the control device 7 is different from the value in the normal state.

The value of CELL_NUM received by the control device 7 is equal to a value obtained by subtracting 2 from the total number of stages of the cell units 6. The control device 7 can ascertain the number of stages of the cell units 6 as a part in which the failure has occurred on the basis of this relationship.

The number of cell units 6 is 3, and the total number of stages of the cell units 6 is 3. When the control device 7 receives "1" which is the value of CELL_NUM (the total number of stages of the cell units 6-2) from the cell unit of the lowest stage, it can be identified that there is a likelihood of disconnection or failure on the receiving side of the cell unit 6 in the second stage from the highest stage.

Even when communication of the control signal α has been restarted and a period in which analysis for identifying a position of the failure part is possible has come, the state in which the control device 7 cannot receive the control signal α may be continued. In this case, the control device 7 identifies that there is a likelihood that a failure has occurred between the cell unit 61 and the control signal α input port of the control device 7.

A case in which a failure occurs at a position different from the failure part will be described below.

Example 2

When "2" which is the value of CELL_NUM (the total number of stages of the cell units 6-1) is received from the cell unit of the lowest stage, the control device 7 estimates that the cell unit of the highest stage (the first-stage cell unit) outputs 0. The failure part in this case can be identified to be between the transmission part of the control device 7 and the reception part of the cell unit of the highest stage.

Example 3

When "0" which is the value of CELL_NUM (the total number of stages of the cell units 6-3) is received from the cell unit of the lowest stage, the control device 7 can identify that the failure part in this case is between the reception part of the third-stage cell unit from the highest stage and the second-stage cell unit.

Example 4

When the control signal α is not received from the cell unit of the lowest stage, the control device 7 can identify that the failure part is between the cell unit of the lowest stage and the control signal α input port (reception part) of the control device 7.

When a failure occurs in a path of a control signal α, a failure part thereof can be identified through the aforementioned processes.

Second Scenario Associated with Control at the Time of Occurrence of Failure:

A case in which a failure occurs in a path of an operation permission signal β will be described below.

Figure 5A:
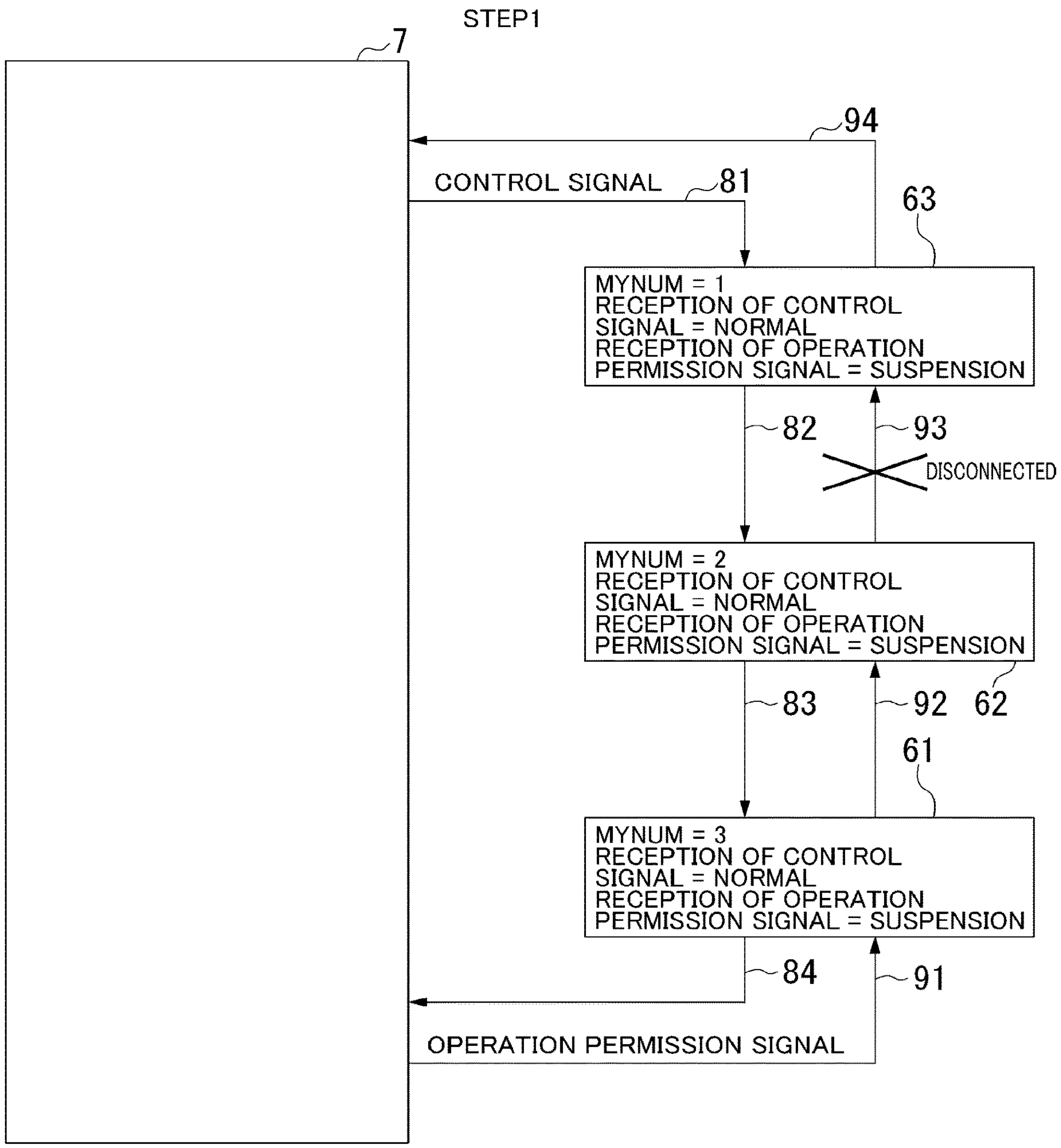
FIG. 5A is a diagram illustrating a case in which only a path of an operation permission signal β is disconnected.
Figure 5B:
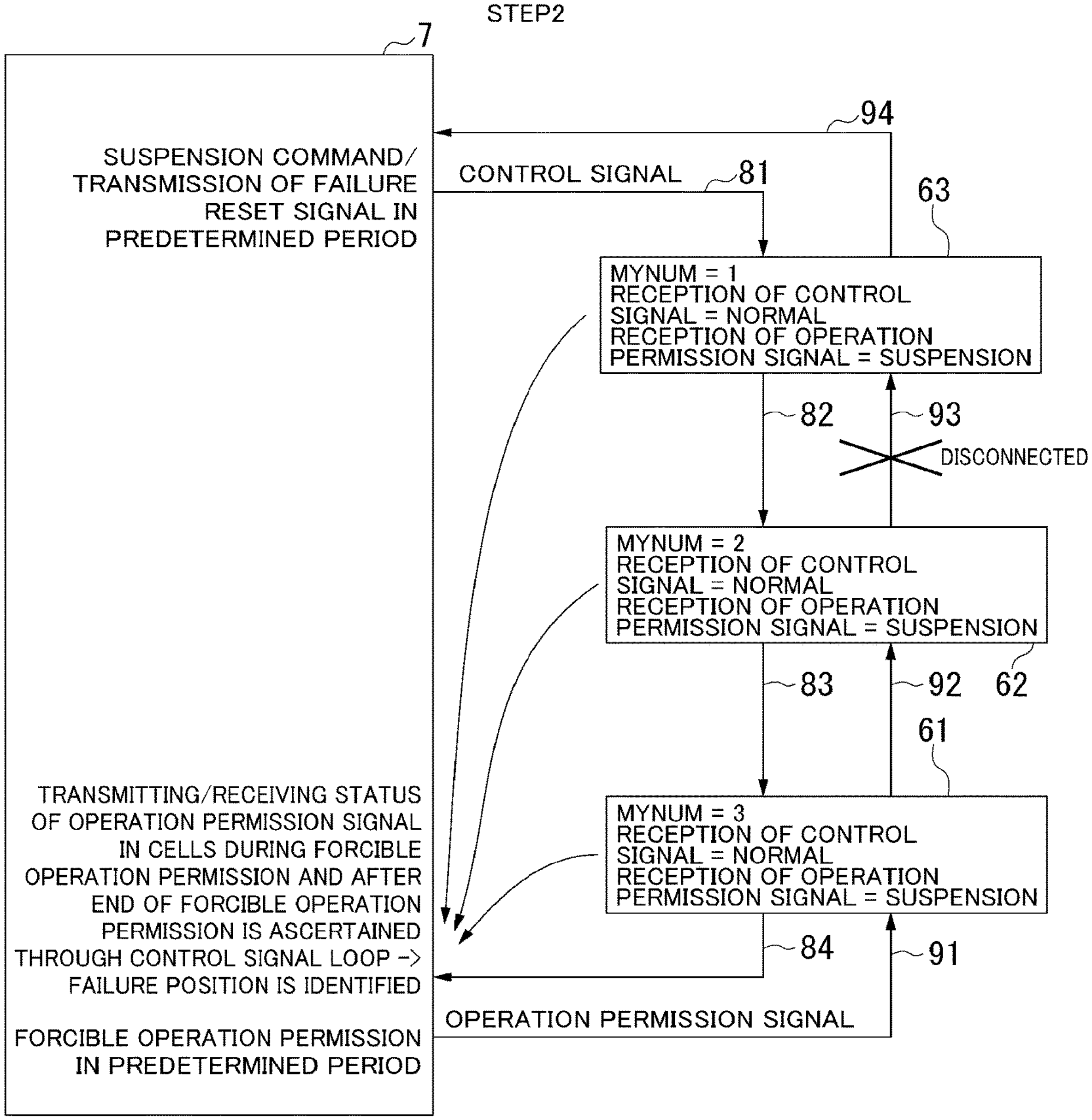
FIG. 5B is a diagram illustrating a case in which only a path of an operation permission signal β is disconnected.

A method of identifying a failure part when only the path of the operation permission signal β is disconnected will be described with reference to FIGS. 5A and 5B. FIGS. 5A and 5B are diagrams illustrating a case in which only the path of the operation permission signal β is disconnected.

(Step 1)

Treatment after a failure has occurred in transmission of an operation permission signal β will be described below in STEP 1 and STEP 2.

STEP 1 is a process for safely guiding the cell units 6 in the power conversion system 1 to suspension when a failure occurs in transmission of the operation permission signal β.

When disconnection occurs in a wiring of the operation permission signal β, the cell unit 6 having detected the disconnection failure issues an operation permission signal β indicating "suspension". The operation permission signal β indicating "suspension" is sequentially transmitted to the cell units 6 and the control device 7. Accordingly, through a loop of the cell units 6 and the control device 7, the operation permission signal β indicating "suspension" is transmitted to the cell units 6 and the control device 7 and held therein.

For example, each cell unit 6 includes a processing block 122 holding the "suspended" state (hereinafter simply referred to as a latch) therein. The control device 7 includes a latch holding the "suspended" state similarly to the cell units 6 therein. Accordingly, even when the failure is recovered, the operation permission signal β is held in the "suspended" state by the latches. Accordingly, this state is continued.

(Step 2)

In order to identify the failure part, the control device 7 performs control such that the "suspended" state of the operation permission signal β is released and operation is restarted.

Releasing of the "suspended" state of the operation permission signal β can be tried in the following sequence on the basis of the premise that the control signal α is transmitted normally through the daisy chain of the control signal α.

For example, when the control device 7 issues a "failure reset signal" and transmits the "failure reset signal" using the control signal α, the latches of the cell units 6 holding the "suspended" state of the operation permission signal β are released. After the "suspended" state of the operation permission signal β has been completely released, operation can be restarted.

Even when the control device 7 issues the "failure reset signal" using the control signal α, the latched state in which the "suspended" state of the operation permission signal β is held may not be released from the "suspended" state. In this case, there is a likelihood that an abnormality has occurred in wiring of the operation permission signal β or a failure detected state is continued in any one cell unit 6. The "failure reset signal" is used to initialize the latched states of the cell units 6.

For example, the control device 7 sends a suspension command and the "failure reset signal" for the cell units 6 using transmission of the control signal α. At the same time, the control device 7 ignores the latches for a predetermined time and forcibly transmits an operation permission signal β indicating "operation."

When the latches of the cell units 6 receive the "failure reset signal" and "forcible operation permission" of the operation permission signal β, the states thereof are reset. The latches of the cell units 6 are configured to give priority to "set" when "set" and "reset" are instructed to a flag indicating a state for the purpose of fail safe. For example, the latch of the cell unit 6 continuing to detect a failure and the output of the operation permission signal β are held on the "suspension" side.

At a time point at which forcible operation permission has been ended, the operation permission signal β is transmitted through the daisy chain thereof and is held in the "suspended" state by the latches again.

When forcible operation permission is maintained and after forcible operation permission has been ended, the cell units 6 transmit the latched states of the cell units 6 and transmitting and receiving states of the operation permission signal β to the control device 7 using the daisy chain of the control signal α. Accordingly, the control device 7 can determine operating situations of the cell units 6 and identify the disconnection failure part on the basis of the determination result.

Third Scenario Associated with Control of Occurrence of Failure:

A case in which a failure occurs in both paths of a control signal α and an operation permission signal β will be described below.

For example, when wiring for the control signal α and the operation permission signal β is performed using an optical fiber cable, a set of cores allocated to the control signal α and the operation permission signal β may be included in a common cable. When a stress is applied to such an optical fiber cable, the cores may be damaged by the stress.

In this case, a failure may occur in one of the core for the control signal α and the core for the operation permission signal β or both cores. When a failure occurs in one of the core for the control signal α and the core for the operation permission signal β, this case corresponds to the first scenario and the second scenario.

When a failure occurs in both of the core for the control signal α and the core for the operation permission signal β, the failure may be included in a predetermined range from a specific position in an extending direction of the optical fiber cable, or the failure may occur at different positions in the extending direction.

A probability that a failure of damage of the core for the control signal α and a failure of damage of the core for the operation permission signal β will occur successively in a period shorter than a time period required for a failure recovering process at different positions in the extending direction of the optical fiber cable can be considered to be low, but is not 0.

In the third scenario, it is assumed that a failure occurs in both the core for the control signal α and the core for the operation permission signal β. The procedure described below as treatment for the third scenario is to sequentially perform the first scenario and the second scenario. In this case, a time period until the failure is resolved is longer than that when a failure occurs in one part.

When a time period required for the failure recovering process in the first scenario and a time period required for the failure recovering process in the second scenario are sufficiently short, there is no significant actual difference between the time periods until two failures are recovered even if a method of sequentially performing the failure recovering processes and performing both the failure recovering processes for a relatively short time is selected.

In this way, when a failure of damage of the core for the control signal q and a failure of damage of the core for the operation permission signal β occur simultaneously, a disconnected position of the control signal α is first identified and recovered through the aforementioned processes. Then, after the disconnection of the control signal α has been recovered, the disconnection of the operation permission signal β can be recovered using the following procedure when disconnection occurs in only the path of the operation permission signal β.

When it is not clear in which of the paths of the control signal α and the operation permission signal β a failure has occurred, the control device 7 may be configured to fixedly perform the procedure described in the third scenario.

According to the embodiment, the power conversion system 1 includes daisy-chain communication lines 8 and 9 and a plurality of cell units 6*s*.

The daisy-chain communication lines 8 and 9 connect a master station for controlling the plurality of cell units 6*s* each including a power converter to the plurality of cell units 6*s*. The plurality of cell units 6*s* are a plurality of cell units 6*s* having a configuration in which a load device is connected to the power converter of a slave station and electric power is supplied to the load device. Each of the plurality of cell units 6*s* switches between "operation" for supplying electric power from the power converter and "suspension" for suspending supply of electric power and supplies electric power to the load device.

Out of a control signal α for controlling a single-phase cell inverter 6IV (a single-phase inverter) of each cell unit 6 and an operation permission signal β for permitting an operation of supplying electric power from the single-phase cell inverter 6IV of each cell unit 6, the daisy-chain communication lines 8 and 9 include a group of a first communication line for sending the control signal α and a second communication line for sending the operation permission signal β. When a communication failure is detected, each cell unit 6 "suspends" supply of electric power from the single-phase cell inverter 6IV of the cell unit 6 having detected the communication failure and "suspends" supply of electric power from the single-phase cell inverter 6IV of other cell units 6 out of the plurality of cell units 6*s* by controlling the other cell units 6 using the control signal α and the operation permission signal β. Then, some or all of the plurality of cell units 6*s* notify the master station of information on a failure part using the control signal α in a state in which supply of electric power from the corresponding single-phase cell inverters 6IV has been "suspended." An index of information on the failure part is defined to identify a failure part. Accordingly, the power conversion system 1 can identify a part in which the communication failure has occurred in a communication system in which a plurality of power converters is connected in a daisy-chain manner.

For example, the control device 7 may send a control signal for controlling the plurality of cell units 6*s* and transmit the control signal using communication between the control device 7 and the cell units 6 and communication between the cell units 6. In this case, the first communication line and the second communication line may be provided between the control device 7 and the cell units 6 and between the cell units 6 and may be available independently from each other. The first communication line and the second communication configured in this way may not have symmetry.

Each cell unit 6 may output the operation permission signal β indicating "suspension" to a next stage when an abnormality disturbing the operation is detected or when the operation permission signal β indicating "suspension" is received. Accordingly, the other cell units 6 or the like can be notified that an abnormality disturbing operation has been detected and that the operation permission signal β indicating "suspension" has been received using the operation permission signal β.

When the power conversion system 1 includes the control device 7, the control device 7 can receive a second operation permission signal β indicating "suspension" from the cell unit 63 and transmit a first operation permission signal β indicating "suspension" to the cell unit 61 in response to reception of the second operation permission signal β indicating "suspension". Accordingly, it is possible to circulate the operation permission signal β.

The control device 7 further includes a control signal α output port αO for sending the control signal α to the cell unit 63 (the second slave station). The control device 7 can control operating states of the cell units 6 using the control signal α.

The control device 7 sends the first operation permission signal β indicating "suspension" from the operation permission signal β output port βO in response to reception of the second operation permission signal β when the second operation permission signal β indicating "suspension" is received. The control device 7 maintains a state of "suspension" indicated by the first operation permission signal β in a predetermined period after the first operation permission signal β has been sent. A detection period is defined in the predetermined period, and the number of relaying times of the control signal α may be included in the control signal α received from the cell unit 61 in the detection period. In this case, the control device 7 may identify a failure part on the basis of a conversion result by converting the number of relaying times of the control signal α using a predetermined conversion rule.

Each cell unit 6 sends the control signal α including the number of relaying times of the control signal α in the detection period defined in the predetermined period. Accordingly, the control device 7 can identify the number of relaying times of the control signal α using the daisy-chain communication line 8 and identify that a failure such as disconnection occurs on the basis of change of the number of relaying times.

According to at least one of the aforementioned embodiments, a power conversion system includes a daisy-chain communication line and a plurality of slave stations. The daisy-chain communication line connects a master station for controlling the plurality of slave stations each including a power converter to the plurality of slave stations. The plurality of slave stations has a configuration in which a load device is connected to the power converter of a slave station and electric power is supplied to the load device. Each of the plurality of slave stations switches between "operation" for supplying electric power from the power converter and "suspension" for suspending supply of electric power and supplies electric power to the load device. Out of a control signal α for controlling the power converter of each of the plurality of slave stations and an operation permission signal β for permitting an operation of supplying electric power from the power converter of each slave station, the daisy-chain communication line includes a group of a first communication line for sending the control signal α and a second communication line for sending the operation permission signal β. When a communication failure is detected, each slave station "suspends" supply of electric power from the power converter of the slave station having detected the communication failure and "suspends" supply of electric power from the power converter of another slave station out of the plurality of slave stations by controlling the other slave station using the control signal α and the operation permission signal β. Then, some or all of the plurality of slave stations notify the master station of information on a failure part defined to identify the failure part using the control signal α in a state in which supply of electric power from the corresponding power converters has been "suspended." Accordingly, the power conversion system can identify a part in which a communication failure has occurred in a communication system in which a plurality of power converters is connected in a daisy-chain manner.

Some or all of the functional units of the control device 7 and the cell unit controller 6CUC in the power conversion system 1 according to the embodiment described above are software functional units which are realized, for example, by causing a processor of a computer (a hardware processor) to execute a program (a computer program, a software component) stored in a storage unit (such as a memory) of the computer. Some or all of the functional units of the control device 7 and the cell unit controller 6CUC may be realized by hardware such as a large-scale integration (LSI) circuit, an application-specific integrated circuit (ASIC), or a fieldprogrammable gate array (FPGA) or may be cooperatively realized by software functional units and hardware.

While some embodiments have been described above, the configuration of the present invention is not limited to the embodiments. For example, the constituents of the embodiments may be combined or may be applied to constituents of which description is omitted. For example, description associated with the U phase which is the first phase of the electric motor 3 may be applied to the V phase which is the second phase and the W phase which is the third phase of the electric motor 3.

While some embodiments of the present invention have been described above, the embodiments are presented as an example and are not intended to limit the scope of the invention. These embodiments can be modified in various forms and can be subjected to various omissions, substitutions, and alterations without departing from the gist of the invention. The embodiments or modifications thereof are included in the scope or gist of the invention and are also included in the scope of the invention described in the appended claims and scopes equivalent thereto.

The daisy-chain communication lines 8 and 9 may be communication lines for electrical signals or may be communication lines for optical signals. In the embodiment, the connection media 81 to 84 and the connection media 91 to 94 are described to be separate, but, for example, when full duplex communication is enabled, more specifically, when wavelength multiplexing of an optical communication system is used, the connection media of sections can be commonly used by the daisy-chain communication lines 8 and 9.

REFERENCE SIGNS LIST

1 Power conversion system
3 Electric motor
6 Cell unit
6*s* Plurality of cell units
IV Single-phase cell inverter
6CUC Cell unit controller
7 Control device
8, 9 Daisy-chain communication line

The invention claimed is:

1. A power conversion system comprising a daisy-chain communication line connecting a master station for controlling a plurality of slave stations each including a power converter to the plurality of slave stations, wherein the plurality of slave stations has a configuration in which a load device is connected to the power converter of a slave station and electric power is supplied to an electric motor, each of the plurality of slave stations switching between operation for supplying electric power from the power converter and suspension for suspending supply of electric power and supplying electric power to the load device, wherein out of a control signal (α) for controlling the power converter of each of the plurality of slave stations and an operation permission signal (β) for permitting an operation of supplying electric power from the power converter of each slave station, the daisy-chain communication line includes a group of a first communication line for sending the control signal (α) and a second communication line for sending the operation permission signal (β), wherein, when a communication failure is detected, each slave station suspends supply of electric power from the power converter of the slave station having detected the communication failure and suspends supply of electric power from the power converter of another slave station out of the plurality of slave stations by controlling the other slave station using the control signal (α) and the operation permission signal (β), and wherein some or all of the plurality of slave stations notify the master station of information on a failure part defined to identify the failure part using the control signal (α) in a state in which supply of electric power from the corresponding power converters has been suspended.

2. The power conversion system according to claim 1, wherein the master station sends the control signal (α) for controlling the plurality of slave stations and transmits the control signal (α) using communication between the master station and the slave stations and communication between the slave stations, and wherein the first communication line and the second communication line are independently available.

3. The power conversion system according to claim 2, wherein the first communication line and the second communication line are provided between the master station and the slave stations and between the slave stations.

4. The power conversion system according to claim 2, wherein each slave station outputs the operation permission signal (β) indicating suspension to a next stage when an abnormality disturbing the operation is detected or when the operation permission signal (β) indicating suspension is received.

5. The power conversion system according to claim 2, wherein the power conversion system comprises the master station, wherein the master station includes:

an operation permission signal (β) output port for sending a first operation permission signal (β) indicating operation or suspension as the operation permission signal (β) to a first slave station in the plurality of slave stations; and an operation permission signal (β) input port for receiving a second operation permission signal (β) from a second slave station out of the plurality of slave stations located downstream in a transmission direction of the operation permission signal (β) from the first slave station, and wherein the master station receives the second operation permission signal (β) indicating suspension and transmits the first operation permission signal (β) indicating suspension with receiving of the second operation permission signal (β) indicating suspension.

6. The power conversion system according to claim 1, wherein the first communication line and the second communication line are provided between the master station and the slave stations and between the slave stations.

7. The power conversion system according to claim 1, wherein each slave station outputs the operation permission signal (β) indicating suspension to a next stage when an abnormality disturbing the operation is detected or when the operation permission signal (β) indicating suspension is received.

8. The power conversion system according to claim 1, wherein the power conversion system comprises the master station, wherein the master station includes:

an operation permission signal (β) output port for sending a first operation permission signal (β) indicating operation or suspension as the operation permission signal (β) to a first slave station in the plurality of slave stations; and an operation permission signal (β) input port for receiving a second operation permission signal (β) from a second slave station out of the plurality of slave stations located downstream in a transmission direction of the operation permission signal (β) from the first slave station, and wherein the master station receives the second operation permission signal (β) indicating suspension and transmits the first operation permission signal (β) indicating suspension with receiving of the second operation permission signal (β) indicating suspension.

9. The power conversion system according to claim 8, wherein the master station further includes a control signal (α) output port for sending the control signal (α) to the second slave station, and wherein the master station controls operating states of the slave stations using the control signal (α).

10. The power conversion system according to claim 8, wherein the master station sends the first operation permission signal (β) indicating suspension from the operation permission signal (β) output port when the second operation permission signal (β) indicating suspension is received and maintains a state of suspension indicated by the first operation permission signal (β) in a predetermined period after the first operation permission signal (β) has been sent, and wherein the master station identifies a failure part using a conversion rule on the basis of the number of relaying times of the control signal (α) included in the control signal (α) received from the first slave station in a detection period defined in the predetermined period.

11. The power conversion system according to claim 10, wherein each slave station sends the control signal (α) including the number of relaying times of the control signal (α) in the detection period defined in the predetermined period.

12. A control method for a power conversion system that supplies electric power to a load device connected to a power converter of each slave station by controlling the power converter in each slave station using communication between a master station and the slave stations and communication between the slave stations and switches between operation for supplying electric power from the power converter and suspension for suspending supply of electric power in the supply of electric power, wherein the power conversion system includes:

a plurality of slave stations of which the power converters are controlled by the master station; and a daisy-chain communication line that connects the master station to the plurality of slave stations, wherein, out of a control signal (α) for controlling the power converter of each of the plurality of slave stations and an operation permission signal (β) for permitting an operation of supplying electric power from the power converter of each slave station, the daisy-chain communication line includes a group of a first communication line for sending the control signal (α) and a second communication line for sending the operation permission signal (β), wherein, when a communication failure is detected, each slave station suspends supply of electric power from the power converter of the slave station having detected the communication failure and suspends supply of electric power from the power converter of another slave station out of the plurality of slave stations by controlling the other slave station using the control signal (α) and the operation permission signal (β), and wherein the plurality of slave stations notifies the master station of information on a failure part using the control signal (α) in a state in which supply of electric power from the corresponding power converters has been suspended.

* * * * *